United States Patent
Zakaria et al.

(10) Patent No.: US 12,323,225 B2
(45) Date of Patent: Jun. 3, 2025

(54) SYSTEMS AND METHODS FOR ENABLING DATA AND VOICE COMMUNICATIONS VIA SATELLITE NETWORK

(71) Applicant: Hughes Network Systems, LLC, Germantown, MD (US)

(72) Inventors: Gaguk Zakaria, Germantown, MD (US); Bhanu Durvasula, Germantown, MD (US)

(73) Assignee: Hughes Network Systems, LLC

( * ) Notice: Subject to any disclaimer, the term of this patent is extended or adjusted under 35 U.S.C. 154(b) by 130 days.

(21) Appl. No.: 18/092,013

(22) Filed: Dec. 30, 2022

(65) Prior Publication Data

US 2023/0246709 A1    Aug. 3, 2023

Related U.S. Application Data

(60) Provisional application No. 63/304,564, filed on Jan. 28, 2022.

(51) Int. Cl.
*H04K 1/10*    (2006.01)
*H04B 7/185*   (2006.01)
(Continued)

(52) U.S. Cl.
CPC ....... *H04B 7/1856* (2013.01); *H04B 7/18545* (2013.01); *H04W 8/02* (2013.01)

(58) Field of Classification Search
CPC .............. H04B 7/1856; H04B 7/18545; H04B 7/18513; H04W 8/02; H04W 8/12
(Continued)

(56) References Cited

U.S. PATENT DOCUMENTS

| | | | | |
|---|---|---|---|---|
| 2007/0070948 A1* | 3/2007 | Kezys | ................... | H04W 36/18 370/331 |
| 2016/0028472 A1* | 1/2016 | Valencia | ............ | H04B 7/18513 370/316 |

(Continued)

FOREIGN PATENT DOCUMENTS

| | | |
|---|---|---|
| CN | 104937966 A | 9/2015 |
| CN | 112449375 A | 3/2021 |
| EP | 2467971 B1 | 5/2017 |

OTHER PUBLICATIONS

International Search Report issued Aug. 31, 2023 in corresponding International Application No. PCT/US23/11276.

(Continued)

*Primary Examiner* — Phuong Phu
(74) *Attorney, Agent, or Firm* — Global IP Counselors, LLP

(57) ABSTRACT

Systems and methods for enabling data and voice communications via a satellite network are disclosed herein. In an embodiment, a method of enabling data and voice communications for a user terminal includes establishing a local connection between the user terminal and a first core network operated by a first network provider, routing data communications received by the first core network from the user terminal to a satellite terminal operated by the first network provider for further transmission via a satellite, and routing voice communications received by the first core network from the user terminal to a second core network operated by a second network provider.

20 Claims, 8 Drawing Sheets

(51) Int. Cl.
  *H04L 27/28* (2006.01)
  *H04W 8/02* (2009.01)
(58) Field of Classification Search
  USPC .......................................... 375/260, 219, 220
  See application file for complete search history.

(56) References Cited

U.S. PATENT DOCUMENTS

| 2016/0157084 | A1* | 6/2016 | Tsubouchi | H04W 8/12 |
| | | | | 455/432.1 |
| 2016/0262057 | A1* | 9/2016 | Speicher | H04W 28/24 |
| 2017/0289625 | A1 | 10/2017 | Dankberg | |
| 2018/0205639 | A1 | 7/2018 | Zakaria et al. | |
| 2021/0176634 | A1 | 6/2021 | Badar et al. | |
| 2021/0385192 | A1 | 12/2021 | Zhang et al. | |

OTHER PUBLICATIONS

Xinran Fang et al.; "5G Embraces Satellites for 6G Ubiquitous IoT Basic Models for Integrated Satellite Terrestrial Networks"; IEEE Internet of Things; vol. 8, Issue 18; c. 2021; pp. 1-18.

* cited by examiner

SYSTEMS AND METHODS FOR ENABLING DATA AND VOICE COMMUNICATIONS VIA SATELLITE NETWORK

PRIORITY

This application claims priority to U.S. Provisional Application No. 63/304,564, filed Jan. 28, 2022, entitled "LTE Data and VoLTE Via VSAT Network", the entire contents of which is incorporated herein by reference and relied upon.

BACKGROUND

Field

The present disclosure is directed to systems and methods for enabling data and voice communications via a satellite network. More specifically, the present disclosure is directed to systems and methods that enable data and voice communications in unserved or underserved areas.

Background Information

Broadband internet has become an invaluable tool, but many areas of the world are unserved or underserved by broadband services due to a limited or lack of network infrastructure. A user visiting such an area may have a device configured to connect to a Public Land Mobile Network (PLMN) that does not extend into that area. If the area has another PLMN set up for coverage, the device may be able to connect by roaming but will not have the same service as if the device was located in its Home PLMN. For example, a roaming device utilizing a Visiting PLMN may not provide native voice (e.g., VoLTE) which requires a special license.

SUMMARY

The present disclosure provides systems and methods for enabling both data and voice services in unserved or underserved areas of the world. More specifically, the present disclosure improves the usage of devices located outside of a Home PLMN while utilizing a Visiting PLMN. The Visiting PLMN can be installed in the unserved or underserved area, enabling any one traveling to the area to use their home devices for both data and voice services. As discussed in more detail below, the systems and methods of the present disclosure enable those home devices to utilize a local connection provided by a Visiting PLMN for data communications (e.g., LTE data), while routing voice communications (e.g., Voice over LTE or "VoLTE") back to the device's Home PLMN.

In view of the state of the known technology, one aspect of the present disclosure is to provide a method of enabling data and voice communications for a user terminal. The method includes establishing a local connection between the user terminal and a first core network operated by a first network provider, routing data communications received by the first core network from the user terminal to a satellite terminal operated by the first network provider for further transmission via a satellite, and routing voice communications received by the first core network from the user terminal to a second core network operated by a second network provider.

Another aspect of the present disclosure is to provide a network configured to enable data and voice communications for a user terminal. The network includes a satellite network and a first core network. The satellite network is operated by a first network operator. The satellite network includes a satellite terminal configured to communicate with a system gateway via a satellite. The first core network is operated by the first network operator. The first core network is configured to receive data communications and voice communications from the user terminal. The first core network is further configured to (i) route the data communications through the satellite network, and (ii) route the voice communications to a second core network operated by a second network operator.

Another aspect of the present disclosure is to provide a core network. The core network includes a serving gateway (SGW) and a first packet data network gateway (PGW). The SGW is configured to route data communications and voice communications to or from a user terminal. The PGW is in communication with a local satellite terminal operated by a first network provider. The SGW is further configured to (i) route the data communications between the user terminal and the first PGW, and (ii) route the voice communications between the user terminal and a second PGW of another core network operated by a second network operator.

Also, other objects, features, aspects and advantages of the disclosed systems and methods will become apparent to those skilled in the art in the field of satellite communication systems from the following detailed description, which, taken in conjunction with the annexed drawings, discloses preferred embodiments of systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the present disclosure as defined by the appended claims and their equivalents.

Figure 1:
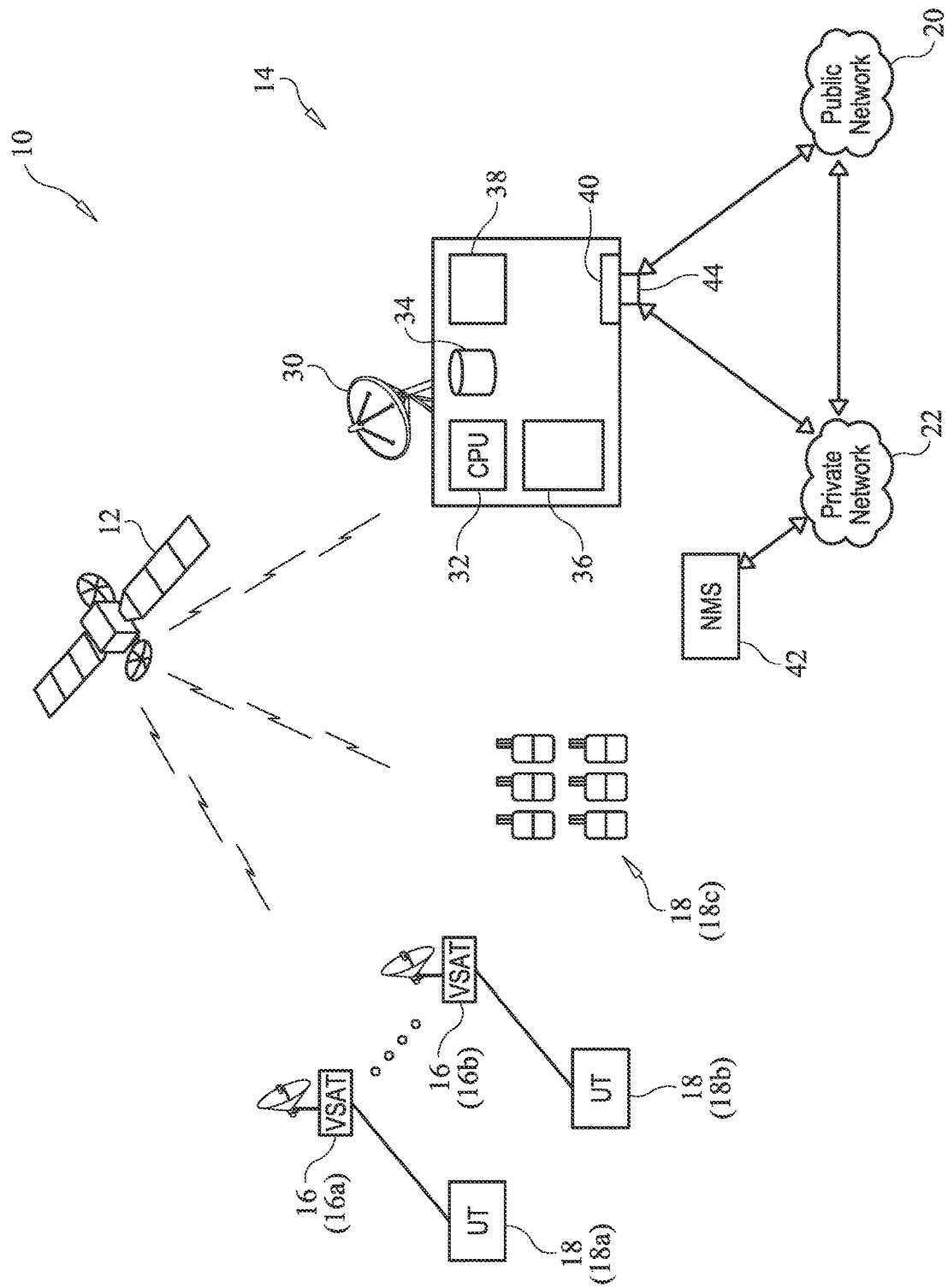
FIG. 1 is a schematic diagram illustrating an example embodiment of a satellite communication system configured in accordance with the present disclosure.

FIG. 1 illustrates a satellite communication system 10 configured to provide voice and data services. The satellite communication system 10 includes a satellite 12 configured to support communications amongst one or more system gateways 14 (one shown) and one or more satellite terminals 16 (16*a*, 16*b*) and/or user terminals 18 (18*a*, 18*b*, 18*c*). Each satellite terminal 16 is configured to relay traffic between user terminals (UTs) 18 (18*a*. 18*b*), a public network 20 such as the internet, and/or a private network 22 via the satellite 12. As illustrated by user terminals 18*c*, some user terminals 18 can also communicate directly with the satellite 12. As shown, the networks 20, 22 are external to the satellite terminals 16 and accessed by the satellite terminals 16 via the satellite 12 and the system gateway 14. Depending on the embodiment, the user terminal 18 can include a portable user device such as a desktop computer, laptop, tablet, cell phone, etc. A user terminal 18 can also include connected appliances that incorporate embedded circuitry for network communication which can also be supported by the satellite terminal 16. Connected appliances can include, for example and without limitation, televisions, home assistants, thermostats, refrigerators, ovens, etc. The network of such devices is commonly referred to as the internet of things (IoT).

In an embodiment, the satellite terminals 16 can be in the form of very small aperture terminals (VSATs) mounted on a structure, habitat, etc. Depending on the specific application, a satellite terminal 16 can incorporate an antenna dish of different sizes (e.g., small, medium, large, etc.). The satellite terminals 16 typically remain in the same location once mounted, unless otherwise removed from the mounting. According to various embodiments, the satellite terminals 16 can be mounted on mobile platforms that facilitate transportation thereof from one location to another. Such mobile platforms can include, for example, cars, buses, boats, planes, etc. The satellite terminals 16 can further be in the form of transportable terminals capable of being transported from one location to another. Such transportable terminals are operational only after arriving at a particular destination, and not while being transported. The satellite terminals 16 can also be in the form of mobile satellite terminals that are capable of being transported to different locations by a user and remain operational while users travel from one location to another In an embodiment, the system gateway 14 is configured to route traffic from stationary, transportable, and mobile satellite terminals (collectively satellite terminals 16) across the public network 20 and private network 22 as appropriate. The system gateway 14 can be further configured to route traffic from the public network 20 and private network 22 across the satellite link to the appropriate satellite terminal 16. The satellite terminal 16 then routes the traffic to the appropriate user terminal (UT) 18.

In an embodiment, the system gateway 14 includes various components, implemented as hardware, software or a combination thereof, to facilitate communication between the satellite terminals 16 and the networks 20, 22 via the satellite 12. In an embodiment, the system gateway 14 includes a radio frequency transceiver 30 (RFT), a processing unit 32 (or computer. CPU, etc.), and a data storage unit 34 (or storage unit). While generically illustrated, the processing unit 32 can encompass various configurations including, without limitations, a personal computer, laptop, server, etc. As used herein, a transceiver corresponds to any type of antenna unit used to transmit and receive signals, a transmitter, a receiver, etc. The RFT 30 is configured to transmit and receive signals within a communication system such as the satellite communication system 10 illustrated in FIG. 1. The data storage unit 34 can be used, for example, to store and provide access to information pertaining to various operations in the satellite communication system 10. Depending on the specific implementation, the data storage unit 34 (or storage unit) can be configured as a single drive, multiple drives, an array of drives configured to operate as a single drive, etc.

According to other embodiments, the system gateway 14 can include multiple processing units 32 and multiple data storage units 34 to accommodate the needs of a particular system implementation. Although not illustrated in FIG. 1, the system gateway 14 can also include one or more workstations (e.g., computers, laptops, etc.) in place of, or in addition to, the one or more processing units 32. Various embodiments further provide for redundant paths for components of the system gateway 14. The redundant paths can be associated with backup components capable of being seamlessly or quickly switched in the event of a failure or critical fault of the primary component.

According to the illustrated embodiment, the system gateway 14 includes baseband components 36 which operate to process signals being transmitted to, and received from, the satellite 12. For example, the baseband components 36 can incorporate one or more modulator/demodulator units, system timing equipment, switching devices, etc. The modulator/demodulator units can be used to generate carriers that are transmitted into each spot beam and to process signals received from the satellite terminals 16. The system timing equipment can be used to distribute timing information for synchronizing transmissions from the satellite terminals 16.

In an embodiment, the system gateway 14 includes a fault management unit 38 configured to monitor activities and output one or more alerts in the event of a malfunction in any of the system gateway components. The fault management unit 38 can include, for example, one or more sensors and interfaces that connect to different components of the system gateway 14. The fault management unit 38 can also be configured to output alerts based on instructions received from a remotely located network management system 42 (NMS). The NMS 42 maintains, in part, information (configuration, processing, management, etc.) for the system gateway 14 and all satellite terminals 16 and beams supported by the system gateway 14. The system gateway 14 can further include a network interface 40, such as one or more edge routers, for establishing connections with a terrestrial connection point 44 from a service provider. Depending on the specific implementation, however, multiple terrestrial connection points 44 may be utilized.

Figure 2:
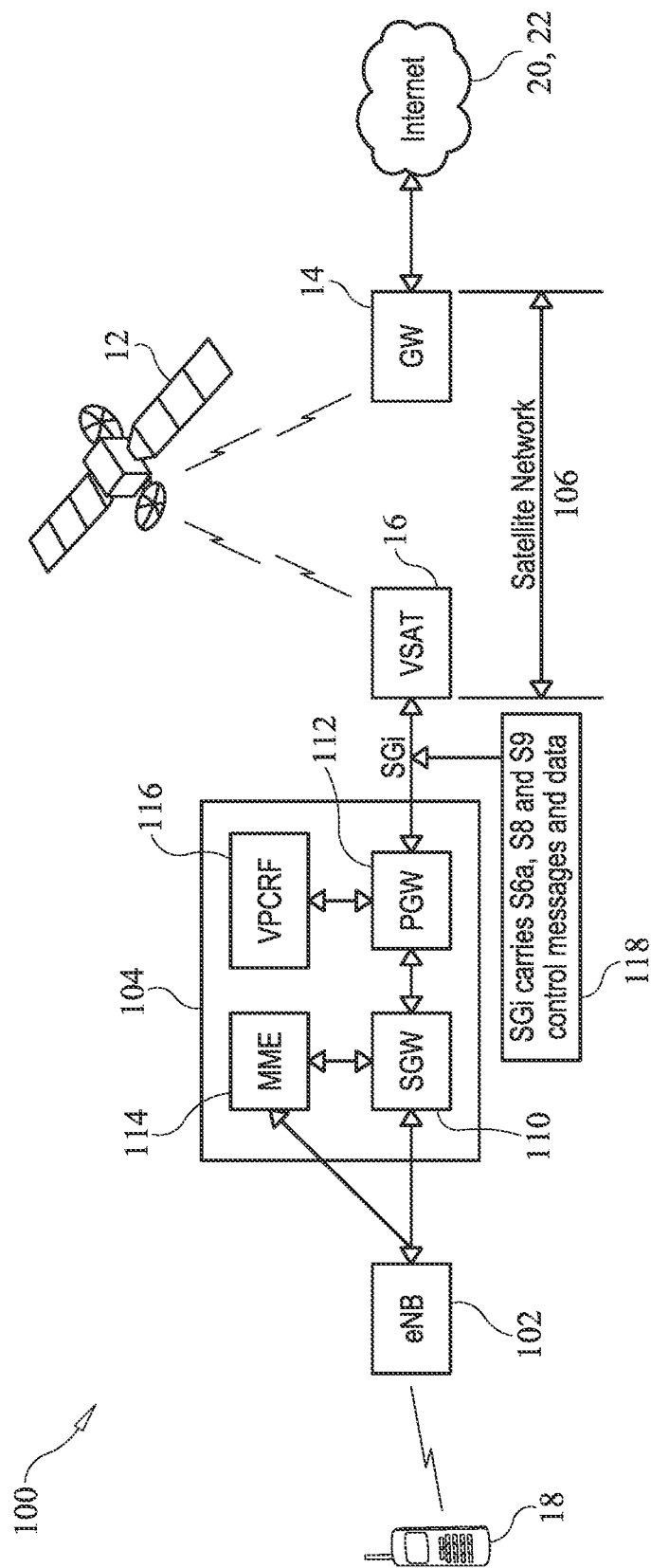
FIG. 2 is a schematic diagram illustrating an example embodiment of a network configured in accordance with the present disclosure.

FIG. 2 illustrates an example embodiment a network 100 configured to enable data communications (e.g., LTE data) and voice communications (e.g., VoLTE) in accordance with the present disclosure. More specifically, the network 100 is configured to enable data and voice communications via networks operated by multiple providers. In the illustrated embodiment, the network 100 includes an LTE network for providing LTE data communications using a satellite communication system (or satellite network) to route traffic to the internet. This can be done, for example, using various components of the system 10 shown in FIG. 1. Depending on the specific implementation, multiple satellites 12 (e.g., a satellite constellation) can be utilized to establish and maintain the communication links.

The network 100 described herein corresponds to a network having common ownership with the first network operator. In other words, the first network operator that controls the network 100 also operates the system 10, making it a Home PLMN for the first network operator's subscribers and a Visiting PLMN for the subscribers of other networks. "Other networks" means networks that are not owned or controlled by the first network operator, such as mobile network operator (MNO) LTE networks. As referred to herein, the "other network" has a second network operator that is different from the first network operator.

The network 100 is configured for example to provide broadband internet to unserved or underserved areas. The network 100 is also configured to enable voice communications for any user terminal 18 subscribing to a network owned by a same or different network operator, as described in more detail below.

In the illustrated embodiment, the network 100 includes a base station 102, a core network 104 and a satellite network 106. The base station 102 is configured to connect to the satellite network 106 via the core network 104. More specifically, the base station 102 is configured to connect to a satellite terminal (e.g., VSAT) 16 via the core network 104, with the satellite terminal 16 providing a satellite backhaul to transmit data via the satellite 12. In the illustrated embodiment, the base station 102, the core network 104 and the satellite terminal 16 are all located locally at the PLMN on the opposite side of the satellite 12 from the system gateway 14. In the illustrated embodiment, the base station 102, the core network 104 and the satellite terminal 16 communicate via one or more local connection.

The base station 102 is configured to establish a local connection between one or more user terminal 18 and the core network 104. The base station 102 can then route data communications and voice communications from the user terminal 18 to the core network 104. The base station 102 can include a macrocell or small cell base station and can be implemented using a Long-Term Evolution (LTE) base station, also referred to as an eNodeB. An eNodeB is configured to operate as a base station for user terminal 18 such as mobile handsets. Those of ordinary skill in the art will recognize from this disclosure that there are various ways to implement an eNodeB in accordance with the embodiments disclosed herein. The base station 102 can be configured to provide a coverage area that has a range of few kilometers, typically five kilometers, for communication with a user terminal 18 (e.g., a mobile handset).

The core network 104 is configured to place the base station 102 in communication with the satellite network 106 to enable data communications between the base station 102 and the satellite network 106. The core network 104 is also configured to enable voice communications via other networks when operating as a Visiting PLMN, as will be described in more detail below with reference to FIG. 3. In an embodiment, the data communications include LTE data communications, and the voice communications include VoLTE communications.

In the illustrated embodiment, the core network 104 includes a serving gateway (SGW) 110, a packet data network gateway (PGW) 112, a mobility management entity (MME) 114 and a visiting policy and charging rules function (VPCRF) 116. The core network 104 can be an LTE or 4G network. The core network 104 can be implemented on or within a small (e.g., hand-sized) housing and located locally with a base station 102 and a satellite terminal 16. More specifically, the SGW 110, PGW 112, MME 114 and/or VPCRF 116 on or within a same housing.

The SGW 110 is configured to route data communications and the voice communications to or from a user terminal 18. For example, the SGW 110 can function as an IP router with General Packet Radio Service (GPRS) Tunnel Protocol (GTP) support and charging functionality. The SOW 110 can also act as an interface module for signaling between the PGW 112 and the MME 114. As explained in more detail below the SGW 110 is configured to route data communications to the PGW 112 for communication to the local satellite terminal 16, and route the voice communications to a second PGW of another core network operated by a second network operator. Those of ordinary skill in the art will recognize from this disclosure the additional or more detailed functions the SGW 110 can also be performed in accordance with the methods described herein.

The PGW 112 is configured to connect the core network 104 to the satellite network 106. More specifically the POW 112 connects the core network 104 to the local satellite terminal 16. The PGW is configured to communicate with the local satellite terminal 16. By assigning an IP address, the PGW 112 can establish a connection to a remote destination. The PGW 112 can also act as an IP router with support for mobile-specific tunneling and signaling protocols. Those of ordinary skill in the art will recognize from this disclosure the additional or more detailed functions the PGW 112 can also be performed in accordance with the methods described herein.

The MME 114 is configured to process signaling information between the user terminal 18 and the core network 104, while also managing certain functions associated with connection and bearer management. More specifically, the MME 114 manages control plane functions related to subscriber and session management. As described in more detail below, the MME 114 is also configured to communicate with a home subscriber server (HSS) operated by the second network operator regarding the user terminal 18, wherein the SGW 110 is configured to route data communications to the PGW 112 for communication to the local satellite terminal 16 after the MME 114 has communicated with the HSS regarding the user terminal 18. Those of ordinary skill in the art will recognize from this disclosure the additional or more detailed functions the MME 114 can also be performed in accordance with the methods described herein.

The VPCRF 116 is the network entity where policy decisions are made. The VPCRF 116 supports service data flow detection, policy enforcement and flow-based charging. For example, the VPCRF can allow or reject a media request, apply a Policy Decision Function (PDF) to an incoming media request, and check the allocation of new resources against a maximum authorized. As described in more detail below, the VCPRF 116 is also configured to communicate with a second PCRF operated by a second network operator regarding a user terminal 18, wherein the SGW 110 is configured to route data communications to the PGW 112 for communication to the local satellite terminal 16 after the VPCRF 116 has communicated with the second PCRF regarding the user terminal 18. Those of ordinary skill in the art will recognize from this disclosure the additional or more detailed functions the VCPRF 116 can also be performed in accordance with the methods described herein.

In an embodiment, an SGi interface 118 is provided between the core network 104 and the satellite terminal 16. The satellite terminal 16 can forward the data from the core network 104 to the system gateway 14 using a bent pipe path facilitated by the satellite 12.

The network 100 illustrated in FIG. 2 is configured to provide a data connection for home users and data and voice (IMS VoLTE) connections for roaming users. As used herein, home users correspond to users that have SIM cards issued by the LTE/satellite operator (the first network operator), whereas roaming users correspond to users that have SIM cards issued by other LTE/satellite operators (e.g., MNOs). The network 100 illustrated in FIG. 2 is capable of advantageously providing high-speed data connection for users in rural/disadvantaged areas, while also providing service to roaming users.

To provide roaming services, the disclosed network 100 functions as a Visiting PLMN (or VPLMN) capable of providing services to mobile subscribers that are outside their home networks (Home PLMN or HPLMN). According to an embodiment, the network 100 is configured to set up an internet data connection with local breakout, which enables the roaming users to have shorter latency for data traffic. Native voice (i.e. VoLTE) utilizes internet multimedia subsystem (IMS) in the Home PLMN provided by the MNO. By using an IMS, which includes Media Gateway in the MNO, the network 100 enables roaming users to call to other SIP-based phones and PSTN phones from the network 100 (Visiting PLMN), as discussed in more detail below.

To provide voice communications (e.g., IMS VoLTE call services), the roaming users obtain the P-CSCF address via several ways. For example, a user terminal 18 can be configured to the P-CSCF address, for example, during initial provisioning or via a 3GPP IMS Management Object (MO). If the domain name is known, DNS resolution is used to obtain the IP address. According to various features, by using MNO provided UICC (SIM and ISIM), the MNO users joining the LTE system are treated as roaming users. During call setup for data, such users are permitted for local breakout. During voice communications (e.g., an IMS VoLTE call), these users are admitted for roaming with home routed traffic.

Figure 3:
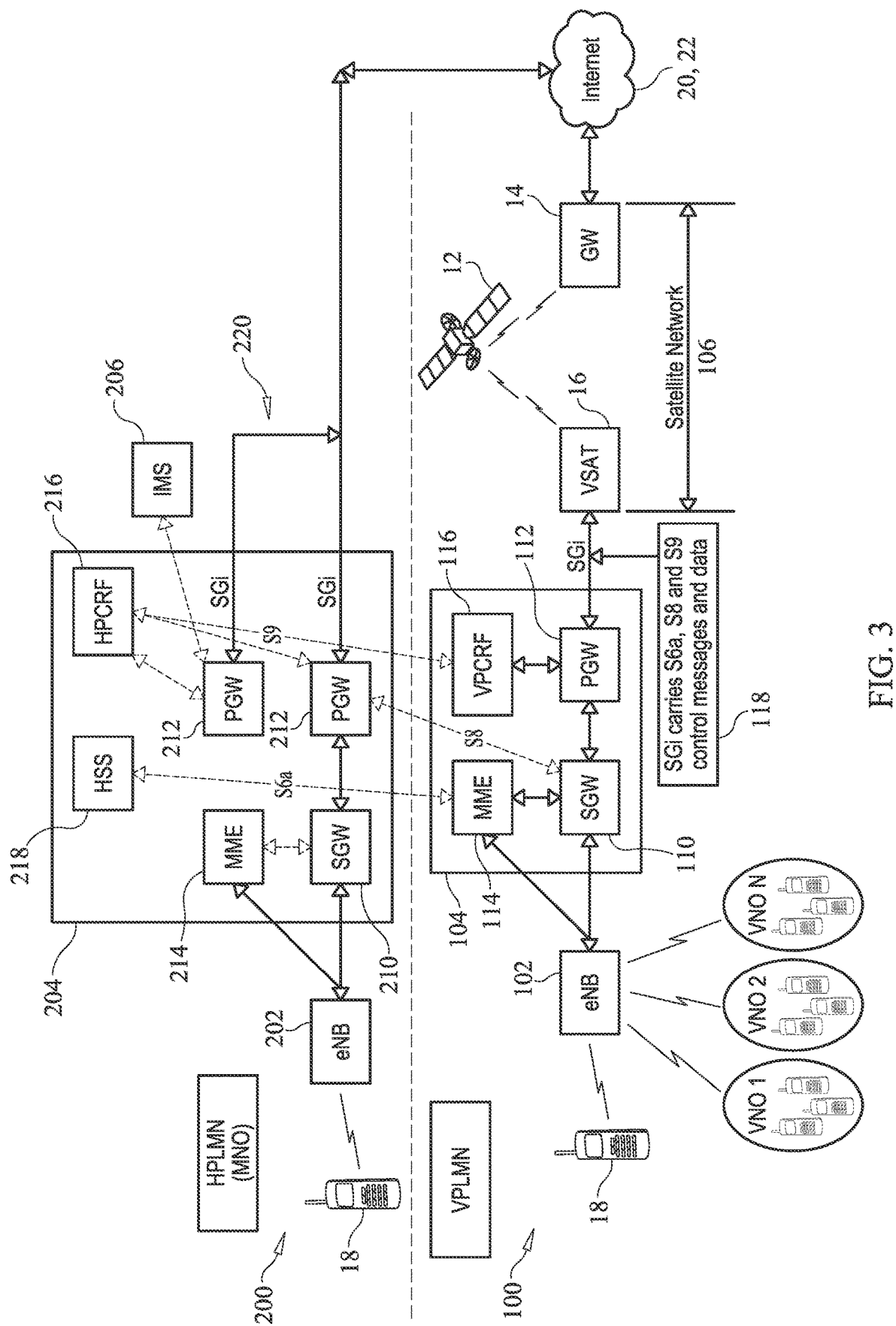
FIG. 3 is a schematic diagram illustrating an example embodiment of multiple networks configured in accordance with the present disclosure.

FIG. 3 illustrates the network 100 of FIG. 2 configured to operate in conjunction with another network 200 operated by a different network operator than that of the network 100. More specifically, FIG. 3 illustrates how the network 100 is configured to route data communications through its own satellite network 108 and route voice communications through the network 200 operated by the different operator (e.g., MNO). The different network operator is referred to herein as a second network operator. In FIG. 3, the user terminal 18 are subscribers of the second network operator of the network 200. The network 100 is thus a Visiting PLMN to those devices, while the network 200 is a Home PLMN to those devices.

The network 200 can be an MNO LTE network, with its users roaming when using the network 100. For roaming users, it is assumed that the MNO of these users has IMS for VoLTE call. The network 100 is configured such that the roaming users can have local breakout for data communications (LTE) as well as a home route for voice communications (VoLTE). It is assumed that the MNO will provide an APN for the voice communications (VoLTE). For example, the operator typically provides two APNs for voice communications (VoLTE). The first APN is used for IMS, while the second APN is used for other services.

In the illustrated embodiment, the network 200 includes a base station 202, a core network 204, and an IP Multimedia Subsystem (IMS) 206. The base station 202 is configured to place one or more user terminal 18 in communication with the core network 204 when the user terminal 18 is utilizing the network 200 as a Home PLMN. As with the base station 102, the base station 202 can include a macrocell or small cell base station and can be implemented using a Long-Term Evolution (LTE) base station, also referred to as an eNodeB.

In the illustrated embodiment, the core network 204 includes a serving gateway (SGW) 210, one or more packet data network gateway (PGW) 212, a mobility management entity (MME) 214, a home policy and charging rules function (HPCRF) 216, and a home subscriber server (HSS) 218. The core network 204 can be an LTE or 4G network. The SGW 210 can be configured as described above with respect to the SGW 110. The PGW 212 can be configured as described above with respect to the PGW 112. The MME 214 can be configured as described above with respect to the MME 114. The HPCRF 216 can be configured as described above with respect to the VPCRF 116. As with the network 100, the network 200 can further include an SGi interface 220 to enable communications between the core network 204 and the networks 20, 22.

The HSS 218 is configured to store and update user subscription information, for example, user identification, addressing, and profile information. The HSS 218 is further configured generate security information from user identity keys, for example, for authentication. Those of ordinary skill in the art will recognize from this disclosure the additional or more detailed functions the HSS 218 can also be performed in accordance with the methods described herein.

The IMS 206 can be a standalone system located outside of the core network 204 that is connected to the PGW 112 via the SGi interface 220. The IMS 206 is configured to handle session management and media control. Those of ordinary skill in the art will recognize from this disclosure the additional or more detailed functions the IMS 206 can also be performed in accordance with the methods described herein.

FIG. 3 illustrates various communications between elements of the core network 104 (first core network) and the core network 204 (second core network). In FIG. 3, the first core network 104 is part of a Visiting PLMN for the user terminal 18, and the second core network 204 is part of a Home PLMN for the user terminal 18. The MME 114 is configured to communicate with the HSS 218. The MME 114 and the HSS 218 are configured to communicate authentication, location & service information about the user terminal 18. In the illustrated embodiment, the MME 114 and the HSS 218 communicate via an S6a interface. The SGW 110 is configured to communicate with the PGW 212. The SGW 110 and the PGW 212 are configured to communicate user and control plane information. In the illustrated embodiment, the SGW 110 and the PGW 212 communicate via an S8 interface. The VPCRF 116 is configured to communicate with the HPCRF 216. The VPCRF 116 and the HPCRF 216 are configured to communicate policy and subscriber information and establish the local breakout discussed herein. In the illustrated embodiment, the VPCRF 116 and the HPCRF 216 communicate via an S9 interface.

FIG. 3 further illustrates that an MNO's network 200 can further support multiple Mobile Virtual Network Operators (VNOs), which can be enabled for data and voice communications by the network 100.

Figure 4:
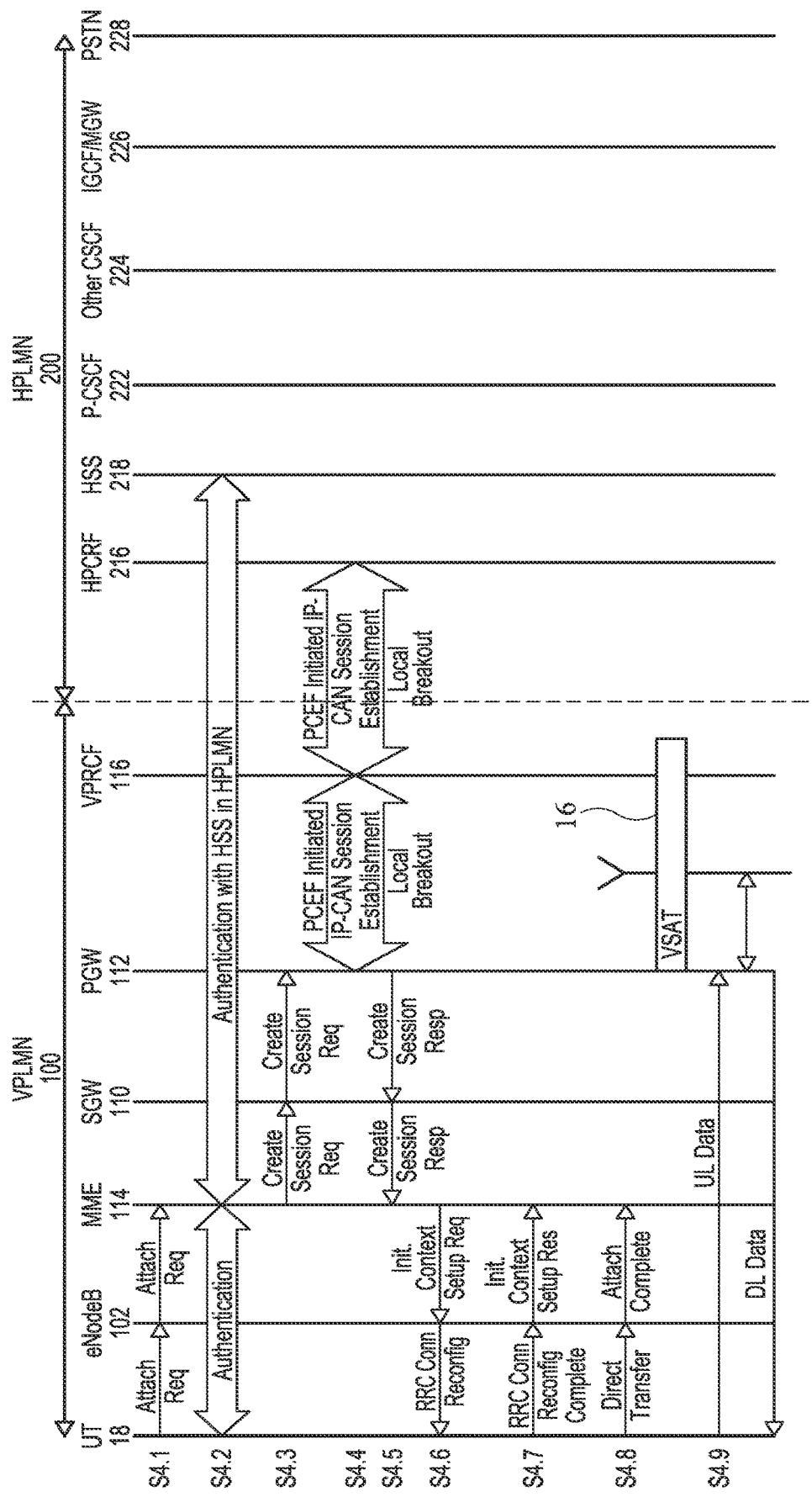
FIG. 4 is a ladder diagram illustrating an example embodiment of a setup for data communications using the networks of FIGS. 2 and 3 in accordance with the present disclosure.
Figure 5:
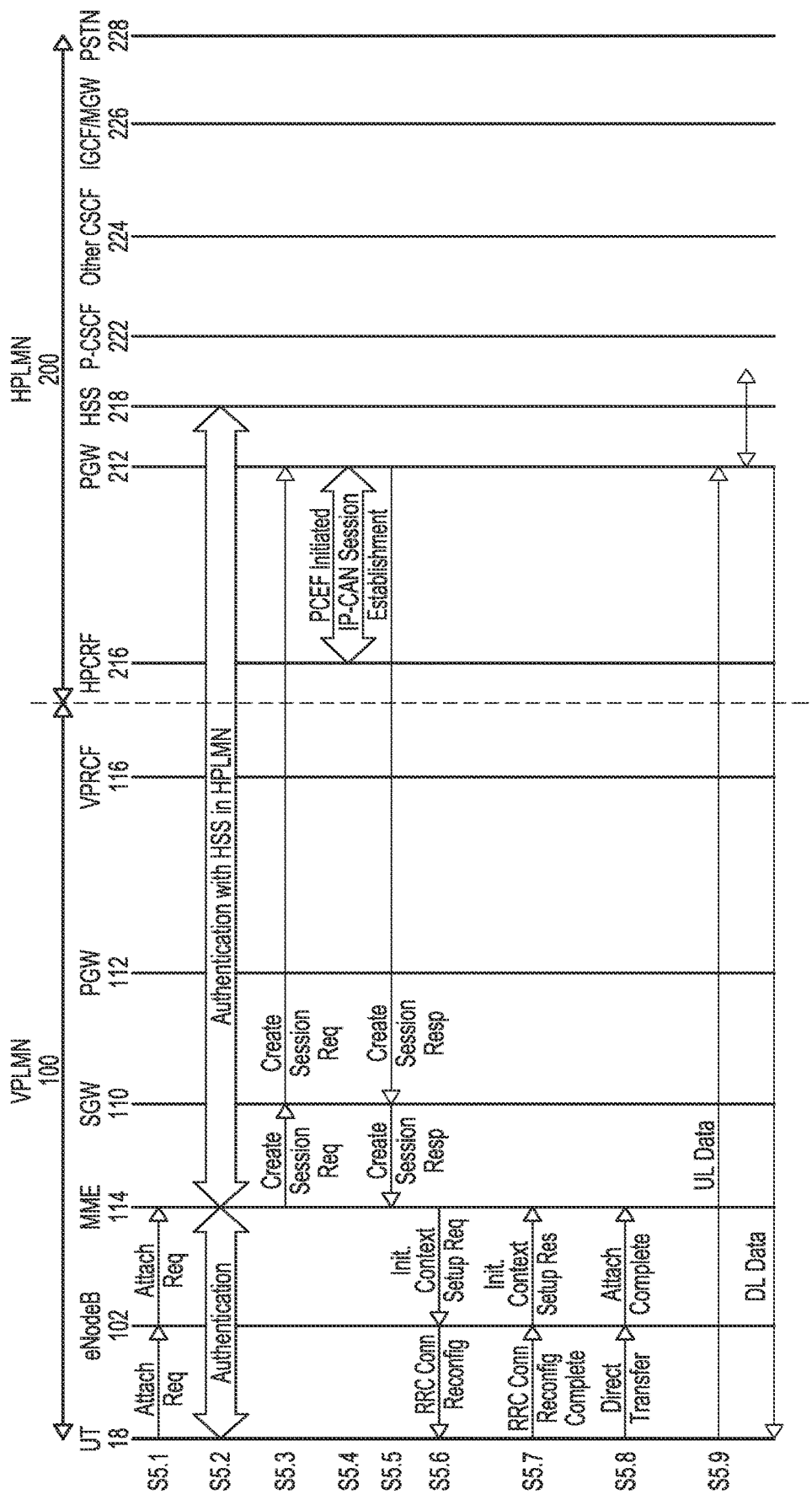
FIG. 5 is a ladder diagram illustrating an example embodiment of a setup for data communications using the networks of FIGS. 2 and 3 in accordance with the present disclosure.
Figure 6:
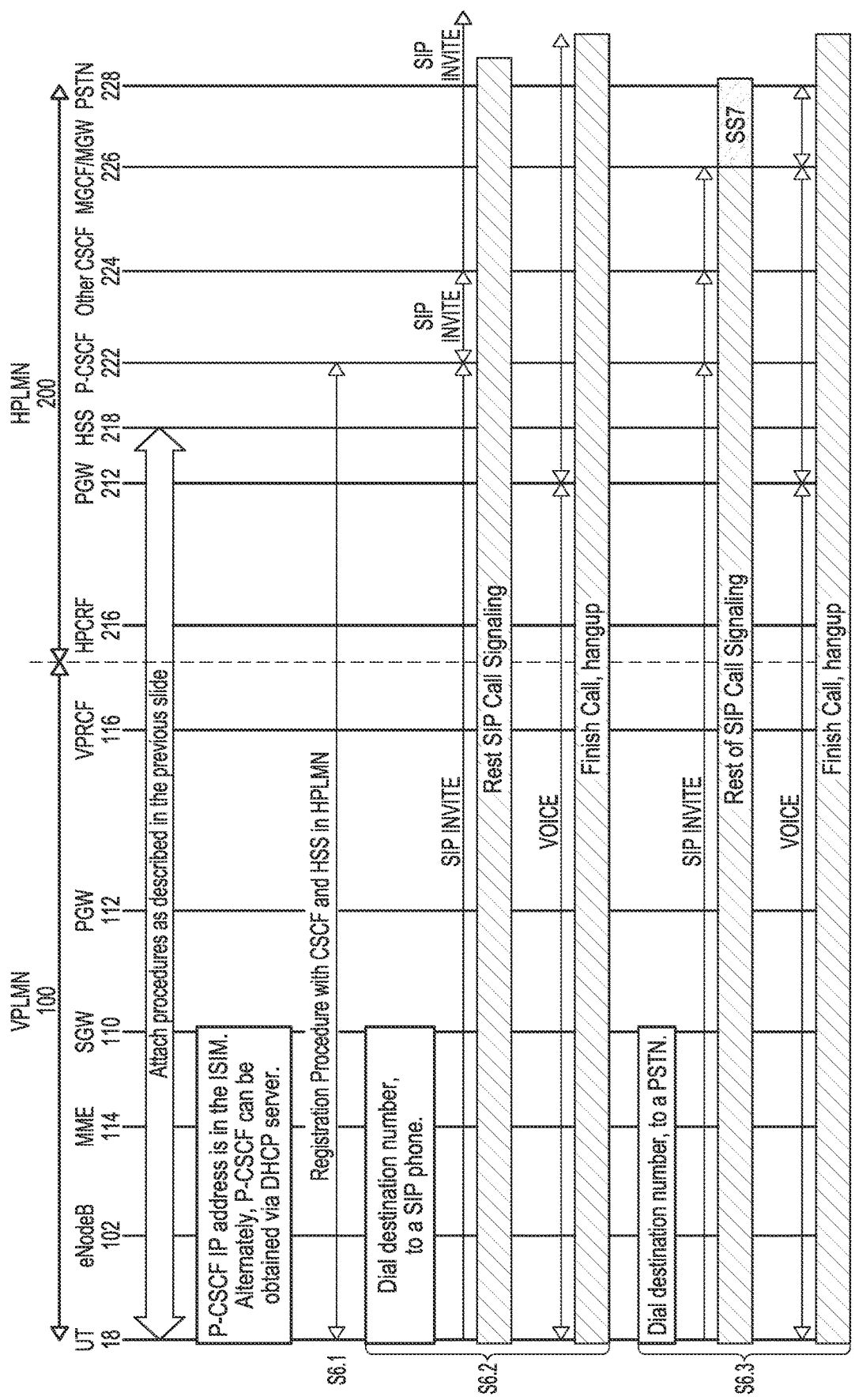
FIG. 6 is a ladder diagram illustrating an example embodiment of a setup for voice communications using the networks of FIGS. 2 and 3 in accordance with the present disclosure.

FIGS. 4 to 6 illustrate example embodiments of how a roaming user can utilize the network 100 (Visiting PLMN) to enable both data communications and voice communications. FIG. 4 is a ladder diagram illustrating various exchanges performed to facilitate data communication for roaming user terminal 18 via local breakout using the network 100 (Visiting PLMN). FIG. 5 is a ladder diagram illustrating various exchanges performed to facilitate a data communication via the roaming user's home network 200

(Home PLMN). FIG. 6 is a ladder diagram illustrating various exchanges performed to facilitate a voice communication via the roaming user's home network 200 (Home PLMN), for example, an IMS VoLTE call setup for the home network 200.

FIG. 4 illustrates an example embodiment of the setup for data communications for roaming user equipment (user terminal 18) via local breakout using the network 100.

At step S4.1, the user terminal 18 communicates an attach request to the MME 114 via the base station 102. More specifically, the user terminal 18 communicates an attach request to the base station 102, and the base station 102 communicates the attach request to the MME 114. If multiple MMEs 114 are available, the base station 102 selects the MME 114 to utilize.

At step S4.2, the MME 114 performs authentication and security with the user terminal 18 to authenticate the user terminal 18 and secure the messages exchanged with the user terminal 18. The core network 104 also communicates with the core network 204 to authenticate the user terminal 18 with the network 200. More specifically, the MME 114 communicates with the HSS 218 of the network 200 to authenticate the user terminal 18 with the network 200.

At step S4.3, if the HSS 218 authenticates the user terminal 18, the MME 114 communicates a create session request to the PGW 112 via the SGW 110. More specifically, the MME 114 communicates the create session request to the SGW 110, and the SGW 110 communicates the create session request to the PGW 112. If there are multiple PGWs 112, the MME 114 can select the appropriate PGW 112 based on subscriber information. The create session request can include the SGW 110 IP address and a selected Tunnel End Point ID (TEID) for the requested bearer, APN and QoS settings.

At step S4.4, the network 100 communicates with the network 200 to establish the local breakout. More specifically, the local breakout is established for the data communications by communicating between the core network 104 and the core network 204. As seen in FIG. 4, the PGW 112 communicates with the VCPRF 116, and the VCPRF 116 communicates with the HPCRF 216 to create the local breakout. In an embodiment, the local breakout can be created via a PCEF initiated IP-CAN session establishment. The local breakout enables the user terminal 18 to receive data services directly from the network 100 instead of the network 200.

At step S4.5, the PGW 112 communicates a create session response message to the MME 114 via the SGW 110. More specifically, the PGW 112 communicates the create session response message to the SGW 110, and the SGW 110 communicates the create session response message to the MME 114. The create session response message can include an allocated IP address for the user terminal 18.

At step S4.6, the MME 114 communicates the initial context setup request with the IP information and TEID to the base station 102, and the base station 102 communicates the information to the user terminal 18 via a reconfiguration request (RRC conn reconfig message). The communication from the base station 102 to the user terminal 18 can also include a radio bearer identifier.

At step S4.7, the user terminal 18 communicates a reconfiguration complete message (e.g., an RRC con reconfig complete message) back to the base station 102 after creation of radio bearer, and the base station 102 communicates an initial context setup response message to the MME 114.

At step S4.8, the user terminal 18 also communicates a direct transfer message to the base station 102, and the base station 102 communicates an attach complete message to the MME 114. The initial context setup response from step S4.7 can be included in the attach complete message.

At step S4.9, upload (UL) data from the user terminal 18 is then transmitted via the PGW 112 by the PGW 112 routing the upload data via the satellite network 106 of the network 100. More specifically, the UL data is transmitted from the PGW 112, to the terminal 16, to the system gateway 14 via the satellite 12 as shown in FIG. 3. Likewise, download data (DL) from the networks 20, 22 is then transmitted via the PGW 112 to the user terminal 18 using the satellite network 106 of the network 100. More specifically, the DL data from the networks 20, 22 is transmitted from the system gateway 14, to the terminal 16 via the satellite 12, to the PGW 112 and then to the user terminal 18. In this way the user terminal 18 is enabled to use the satellite network 106 of the network 100 for data communications once the process shown in FIG. 4 is complete.

FIG. 5 illustrates an example embodiment of the setup for data communications for the same roaming user via the roaming user's home network 200.

At step S5.1, the user terminal 18 communicates an attach request to the MME 114 via the base station 102. More specifically, the user terminal 18 communicates an attach request to the base station 102, and the base station 102 communicates the attach request to the MME 114. If multiple MMEs 114 are available, the base station 102 selects the MME 114 to utilize.

At step S5.2, the MME 114 performs authentication and security with the user terminal 18 to authenticate the user terminal 18 and secure the messages exchanged with the user terminal 18. The core network 104 also communicates with the core network 204 to authenticate the user terminal 18 with the network 200. More specifically, the MME 114 communicates with the HSS 218 of the network 200 to authenticate the user terminal 18 with the network 200.

At step S5.3, if the HSS 218 authenticates the user terminal 18, the network 100 communicates a create session request to the network 200. More specifically, the MME 114 communicates the create session request to the SGW 110, and the SGW 110 communicates the create session request to the PGW 212. If there are multiple PGWs 212, the MME 114 can select the appropriate PGW 212 based on subscriber information. The create session request can include the SGW 110 IP address and a selected TEID for the requested bearer, APN and QoS settings.

At step S5.4, the PGW 212 communicates with the HPCRF 216 to establish the session. In an embodiment, the session can be created via a PCEF initiated IP-CAN session establishment.

At step S5.5, the network 200 communicates a create session response message to the network 100. More specifically, the PGW 212 communicates the create session response message to the SGW 110, and the SGW 110 communicates the create session response message to the MME 114. The create session response message can include an allocated IP address for the user terminal 18.

At step S5.6, the MME 114 communicates the initial context setup request with the IP information and TEID to the base station 102, and the base station 102 communicates the information to the user terminal 18 via a reconfiguration request (RRC conn reconfig message). The communication from the base station 102 to the user terminal 18 can also include a radio bearer identifier.

At step S5.7, the user terminal 18 communicates a reconfiguration complete message (e.g., an RRC con reconfig complete message) back to the base station 102 after creation of radio bearer, and the base station 102 communicates an initial context setup response message to the MME 114.

At step S5.8, the user terminal 18 also communicates a direct transfer message to the base station 102, and the base station 102 sends an attach complete message to the MME 114. The initial context setup response from step S4.7 can be included in the attach complete message.

At step S5.9, upload (UL) data from the user terminal 18 is then transmitted via the PGW 212 using the network 200. More specifically, the UL data is transmitted from the PGW to the networks 20, 22 using the network 200 (Home PLMN) as seen in FIG. 3. Likewise, download data (DL) from the networks 20, 22 is then transmitted via the PGW 212 to the user terminal 18. In this way the user terminal 18 is enabled to use the network 200 for data communications once the process shown in FIG. 5 is complete. More specifically, the network 100 enables the user terminal 18 to use the network 200 by routing the communications through the network 200.

FIG. 6 illustrates an example embodiment of the setup for voice communications (VoLTE) for the same roaming user via the network 200 (Home PLMN). With the methods of the present disclosure, voice communications are routed through the network 200 for example because voice communications require special licenses provided by the home network 200.

As illustrated, FIG. 6 begins with the attach procedures shown in FIG. 5. In an embodiment, the P-CSCF IP address is in the SIM card for the user terminal 18. Alternatively, the P-CSCF can be obtained from the DHCP server.

At step S6.1, the user terminal 18, the network 100 and the network 200 communicate to perform registration procedures with the Proxy Call Session Control Function (P-CSCF) 222 and HSS 218 in the network 200. This can enable a Session Initial Protocol (SIP) call, as shown at step S6.2. This can also enable a Public Switched Telephone Network (PSTN) call, as shown at step S6.3.

Step S6.2 illustrates an SIP call. First, a destination number to an SIP phone is dialed at the user terminal 18. The user terminal 18 communicates an SIP invite to the network 200 via the network 100 to cause the rest of the SIP call signaling. More specifically, the SIP invite is transmitted to the P-CSCF 222 of the network 200 to cause the rest of the SIP call signaling. The SIP invite can also be communicated to another CSCF 224 or outside of the network 200. Voice communications are thereafter transmitted from the user terminal 18 to the network 200 via the network 100. More specifically, voice communications are transmitted to the PGW 212 of the network 200. The PGW 212 can then transmit the voice communications to the appropriate SIP phone.

Step S6.3 illustrates a PSTN call. First, a destination number to a PSTN phone is dialed at the user terminal 18. The user terminal 18 communicates an SIP invite to the network 200 via the network 100 to cause the rest of the SIP call signaling. More specifically, the SIP invite is transmitted to the P-CSCF 222 of the network 200 to cause the rest of the SIP call signaling. The SIP invite can also be communicated to another CSCF 224 or an MGCF/MGW 226. An SS7 protocol can be used for example to signal the PSTN. Voice communications are thereafter transmitted from the user terminal 18 to the network 200 via the network 100. More specifically, voice communications are transmitted to the PGW 212 of the network 200. The PGW 212 can then transmit the voice communications to the MGCF/MGW 226, which can transmit the voice communications to the PSTN 228.

Once set up for example as described above, the SGW 110 is configured to route data communications between the user terminal 18 and the PGW 112, and the SGW 110 is configured to route voice communications between the user terminal 18 and the PGW 212. The data communications from the user terminal 18 are routed by the SGW 110 to the PGW 112 and then to the local satellite terminal 16 for communication to the system gateway 14 via the satellite 12. The data communications from the local satellite terminal 16 are routed from the PGW 112 to the user terminal 18 via the SGW 110. The voice communications from the user terminal 18 are routed by the SGW 110 to the PGW 212 of the core network 204 operated by a second network operator. The voice communications to the user terminal 18 are routed from the PGW 212 to the user terminal 18 by the SGW 110.

Thus, with the network 100 shown and described herein, a roaming user terminal 18 having a separate home network 200 can be enabled for both data communications and voice communications. The data communications can be enabled via the procedure shown in FIG. 4 and thereafter be transmitted via the satellite network 106 of the network 100. The voice communications can be enabled via the procedure shown in FIG. 6 and thereafter be transmitted via the network 200. In an embodiment, certain data communications can also be enabled via the procedure shown in FIG. 5 and thereafter be transmitted by the network 200.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Further, various features can be implemented using algorithms illustrated in the form of flowcharts and accompanying descriptions. Some or all steps associated with such flowcharts can be performed in a sequence independent manner, unless otherwise indicated. Those skilled in the art will also understand from this disclosure that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 7:
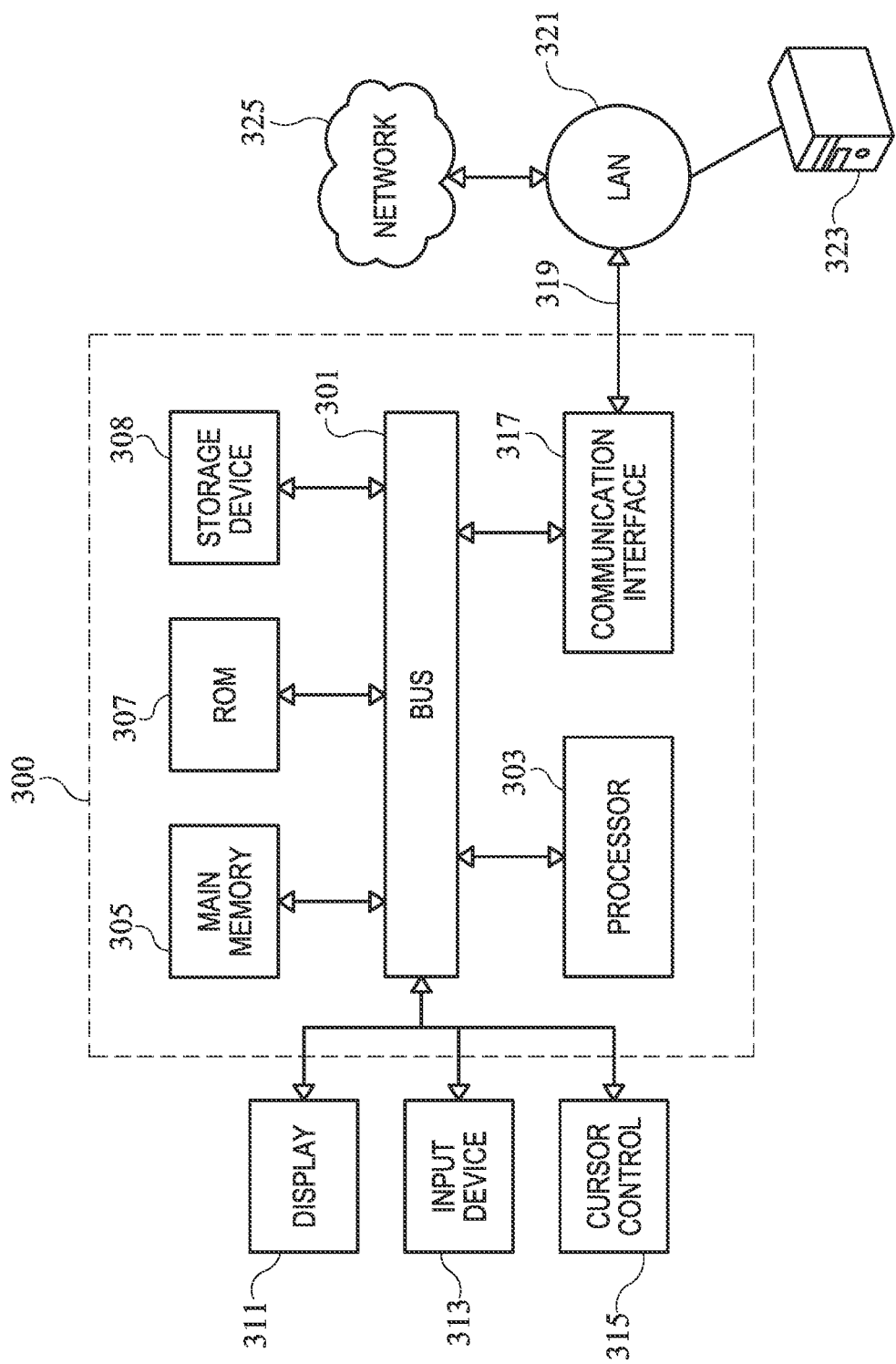
FIG. 7 is a schematic diagram illustrating an example embodiment of a computer system that can be used to implement features of various embodiments discussed herein.

FIG. 7 is a diagram of a computer system that can be used to implement features of various embodiments. The computer system 300 includes a bus 301 or other communication mechanism for communicating information and a processor 303 coupled to the bus 301 for processing information. The computer system 300 also includes main memory 305, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 301 for storing information and instructions to be executed by the processor 303. The main memory 305 can also be used for storing temporary variables or other intermediate information during execution of instructions by the processor 303. The computer system 300 can further include a read only memory (ROM) 307 or other static storage device coupled to the bus 301 for storing static information and instructions for the processor 303. A storage device 309, such as a magnetic disk or optical disk, is coupled to the bus 301 for persistently storing information and instructions.

The computer system 300 can be coupled via the bus 301 to a display 311, such as a light emitting diode (LED) or other flat panel displays, for displaying information to a computer user. An input device 313, such as a keyboard including alphanumeric and other keys, is coupled to the bus 301 for communicating information and command selections to the processor 303. Another type of user input device is a cursor control 315, such as a mouse, a trackball, or cursor direction keys, for communicating direction information and command selections to the processor 303 and for controlling cursor movement on the display 311. Additionally, the display 311 can be touch enabled (i.e., capacitive or resistive) in order facilitate user input via touch or gestures.

According to an exemplary embodiment, the processes described herein are performed by the computer system 300, in response to the processor 303 executing an arrangement of instructions contained in main memory 305. Such instructions can be read into main memory 305 from another computer-readable medium, such as the storage device 309. Execution of the arrangement of instructions contained in main memory 305 causes the processor 303 to perform the process steps described herein. One or more processors in a multiprocessing arrangement may also be employed to execute the instructions contained in main memory 305. In alternative embodiments, hard-wired circuitry can be used in place of or in combination with software instructions to implement exemplary embodiments. Thus, exemplary embodiments are not limited to any specific combination of hardware circuitry and software.

The computer system 300 also includes a communication interface 317 coupled to bus 301. The communication interface 317 provides a two-way data communication coupling to a network link 319 connected to a local network 321. For example, the communication interface 317 can be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 317 can be a local area network (LAN) card (e.g. for Ethernet™ or an Asynchronous Transfer Mode (ATM) network) to provide a data communication connection to a compatible LAN. Wireless links can also be implemented. In any such implementation, communication interface 317 sends and receives electrical, electromagnetic, or optical signals that carry digital data streams representing various types of information. Further, the communication interface 317 can include peripheral interface devices, such as a Universal Serial Bus (USB) interface, a High Definition Multimedia Interface (HDMI), etc. Although a single communication interface 317 is depicted in FIG. 7, multiple communication interfaces can also be employed.

The network link 319 typically provides data communication through one or more networks to other data devices. For example, the network link 319 can provide a connection through local network 321 to a host computer 323, which has connectivity to a network 325 such as a wide area network (WAN) or the Internet. The local network 321 and the network 325 both use electrical, electromagnetic, or optical signals to convey information and instructions. The signals through the various networks and the signals on the network link 319 and through the communication interface 317, which communicate digital data with the computer system 300, are exemplary forms of carrier waves bearing the information and instructions.

The computer system 300 can send messages and receive data, including program code, through the network(s), the network link 319, and the communication interface 317. In the Internet example, a server (not shown) might transmit requested code belonging to an application program for implementing an exemplary embodiment through the network 325, the local network 321 and the communication interface 317. The processor 303 can execute the transmitted code while being received and/or store the code in the storage device 309, or other non-volatile storage for later execution. In this manner, the computer system 300 can obtain application code in the form of a carrier wave.

The term "computer-readable medium" as used herein refers to any medium that participates in providing instructions to the processor 303 for execution. Such a medium may take many forms, including but not limited to non-volatile media, volatile media, and transmission media. Non-volatile media include, for example, optical or magnetic disks, such as the storage device 308. Non-volatile media can further include flash drives, USB drives, microSD cards, etc. Volatile media include dynamic memory, such as main memory 305. Transmission media include coaxial cables, copper wire and fiber optics, including the wires that comprise the bus 301. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
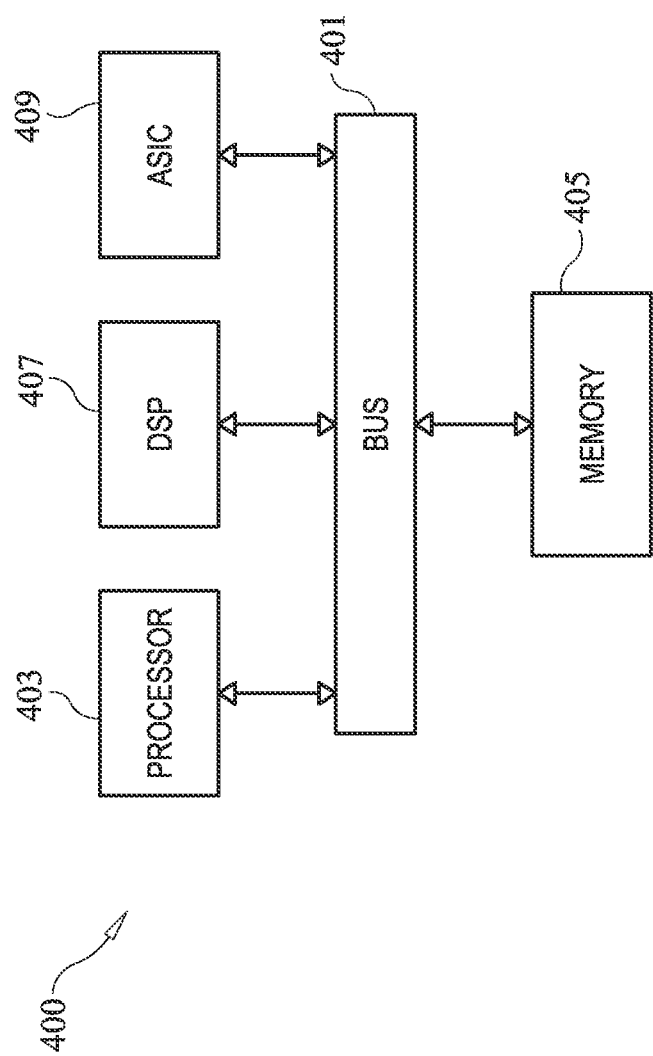
FIG. 8 is a schematic diagram illustrating an example embodiment of a chip set upon which features of various embodiments discussed herein may be implemented.

FIG. 8 illustrates a chip set 400 upon which features of various embodiments can be implemented. The chip set 400 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. The chip set 400, or a portion thereof, constitutes a means for performing one or more steps of the figures.

In one embodiment, the chip set 400 includes a communication mechanism such as a bus 401 for passing information among the components of the chip set 800. A processor 403 has connectivity to the bus 401 to execute instructions and process information stored in, for example, a memory 405. The processor 403 can include one or more processing cores with each core configured to perform independently. A multi-core processor enables multiprocessing within a single physical package. Examples of a multi-core processor include two, four, eight, or greater numbers of processing cores. Alternatively or in addition, the processor 403 can include one or more microprocessors configured in tandem via the bus 401 to enable independent execution of instructions, pipelining, and multithreading. The processor 403 can also be accompanied with one or more specialized components to perform certain processing functions and tasks such as one or more digital signal processors (DSP) 407, or one or more application-specific integrated circuits (ASIC) 409. A DSP 407 typically is configured to process real-world signals (e.g., sound) in real time independently of the processor 403. Similarly, an ASIC 409 can be configured to performed specialized functions not easily performed by a general purposed processor. Other specialized components to aid in performing the functions described herein include one or more field programmable gate arrays (FPGA) (not shown), one or more controllers (not shown), or one or more other special-purpose computer chips.

The processor 403 and accompanying components have connectivity to the memory 405 via the bus 401. The memory 405 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the steps described herein. The memory 405 also stores the data associated with or generated by the execution of the steps.

The embodiments described herein provide improved systems and methods for enabling both data communications and voice communications using a Visiting PLMN. These systems and methods are advantageous, for example, because they can bring broadband internet access to unserved or underserved areas and further improve latency for roaming users that utilize data and voice communications. It should be understood that various changes and modifications to the systems and methods described herein will be apparent to those skilled in the art and can be made without diminishing the intended advantages.

General Interpretation of Terms

In understanding the scope of the present disclosure, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present disclosure, it will be apparent to those skilled in the art from this disclosure that various changes and modifications can be made herein without departing from the scope as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description by the applicant, including the structural and/or functional concepts embodied by such features. Thus, the foregoing descriptions of the embodiments are provided for illustration only, and not for the purpose of limiting the present disclosure as defined by the appended claims and their equivalents.

What is claimed is:

1. A method of enabling data and voice communications for a user terminal subscribing to a first core network having a first packet data network gateway (PGW) and a home subscriber server (HSS) and being operated by a first network provider, the method comprising:
    establishing a local connection between the user terminal and a second core network operated by a second network provider for both data communications and voice communications to be transmitted between the user terminal and the second core network, the second core network including a serving gateway (SGW), a second packet data network gateway (PGW) and a mobility management entity (MME);
    communicating between the MME of the second core network and the HSS of the first core network regarding the user terminal;
    thereafter establishing a local breakout enabling the data communications to be transmitted to and from the user terminal via the second core network;
    thereafter establishing a roaming connection enabling the voice communications to be transmitted to and from the user terminal via both the first core network and the second core network;
    thereafter using the local breakout to route the data communications to and from the user terminal through the SGW and the second PGW of the second core network and a satellite terminal operated by the second network provider that transmits via a satellite; and
    thereafter using the roaming connection to route the voice communications to and from the user terminal through the first PGW of the first core network and the SGW of the second core network.

2. The method of claim 1, wherein
    the first core network is part of a Home Public Land Mobile Network for the user terminal, and
    the second core network is part of a Visiting Public Land Mobile Network for the user terminal.

3. The method of claim 1, comprising
    establishing the local connection between the user terminal and the second core network via a base station, and
    routing the data communications and the voice communications to the second core network from the user terminal via the base station.

4. The method of claim 1, comprising
    routing the data communications from the satellite terminal to a system gateway operated by the second network operator via the satellite, and the second core network and the satellite terminal are located on an opposite side of the satellite from the system gateway.

5. The method of claim 1, wherein
the data communications include LTE data communications, and
the voice communications include VOLTE communications.

6. A network configured to enable data and voice communications for a user terminal subscribing to a first core network having a first packet data network gateway (PGW) and a home subscriber server (HSS) and being operated by a first network provider, the network comprising:
a satellite network operated by a second network operator, the satellite network including a satellite terminal configured to communicate with a system gateway via a satellite; and
a second core network operated by the second network operator, the second core network including a serving gateway (SGW), a second packet data network gateway (PGW) and a mobility management entity (MME),
the second core network configured to transmit data communications and voice communications to and from the user terminal, the second core network further configured to (i) cause communication between the MME and the HSS of the first core network regarding the user terminal; (ii) thereafter establish a local breakout enabling the data communications to be transmitted to and from the user terminal by the second core network; (iii) thereafter establish a roaming connection enabling the voice communications to be transmitted to and from the user terminal via both the first core network and the second core network; (iv) thereafter use the local breakout to route the data communications to and from the user terminal through the SGW, the second PGW and the satellite network, and (v) thereafter use the roaming connection to route the voice communications to and from the user terminal through the SGW and the first PGW of the first core network.

7. The network of claim 6, comprising
a base station configured to receive the data communications and the voice communications from the user terminal and transmit the data communications and the voice communications to the second core network.

8. The network of claim 7, wherein
the base station, the satellite terminal, and the second core network communicate via one or more local connection.

9. The network of claim 6, wherein
the second core network and the satellite terminal are located on an opposite side of the satellite from the system gateway.

10. The network of claim 6, wherein
the data communications include LTE data communications, and
the voice communications include VOLTE communications.

11. The network of claim 6, wherein
the first core network is part of a Home Public Land Mobile Network for the user terminal, and
the second core network is part of a Visiting Public Land Mobile Network for the user terminal.

12. A core network comprising:
a serving gateway (SGW) configured to route data communications and voice communications to or from a user terminal;
a first packet data network gateway (PGW) in communication with a local satellite terminal operated by a first network provider; and
a mobility management entity (MME) configured to communicate with a home subscriber server (HSS) operated by a second network operator regarding the user terminal,
the SGW configured to (i) route the data communications between the user terminal and the first PGW, and (ii) route the voice communications between the user terminal and a second PGW of another core network operated by the second network operator, and
the SGW configured to route the data communications to the first PGW for communication to the local satellite terminal after the MME has communicated with the HSS regarding the user terminal.

13. A core network comprising:
a serving gateway (SGW) configured to route data communications and voice communications to or from a user terminal;
a first packet data network gateway (PGW) in communication with a local satellite terminal operated by a first network provider; and
a first policy and charging rules function (PCRF) configured to communicate with a second PCRF operated by a second network operator regarding the user terminal,
the SGW configured to (i) route the data communications between the user terminal and the first PGW, and (ii) route the voice communications between the user terminal and a second PGW of another core network operated by the second network operator,
the SGW configured to route the data communications to the first PGW for communication to the local satellite terminal after the first PCRF has communicated with the second PCRF regarding the user terminal.

14. The core network of claim 12, wherein
the SGW and the first PGW are implemented on or within a same housing.

15. The core network of claim 12, wherein
the SGW is configured to receive the data communications and the voice communications from the user terminal via a base station.

16. The core network of claim 12, wherein
the data communications include LTE data communications, and
the voice communications include VOLTE communications.

17. The method of claim 1, wherein
establishing the local breakout includes communicating with a policy and charging rules function (PCRF) of the first network provider.

18. The method of claim 1, wherein
establishing the roaming connection includes enabling both session initial protocol (SIP) based phones and public switched telephone network (PSTN) phones from the second core network.

19. The network of claim 6, wherein
the second core network is configured to communicate with a policy and charging rules function (PCRF) of the first network provider when establishing the local breakout.

20. The network of claim 6, wherein
the second core network is configured to enable both session initial protocol (SIP) based phones and public switched telephone network (PSTN) phones from the second core network when establishing the roaming connection.

\* \* \* \* \*